Figure 1:
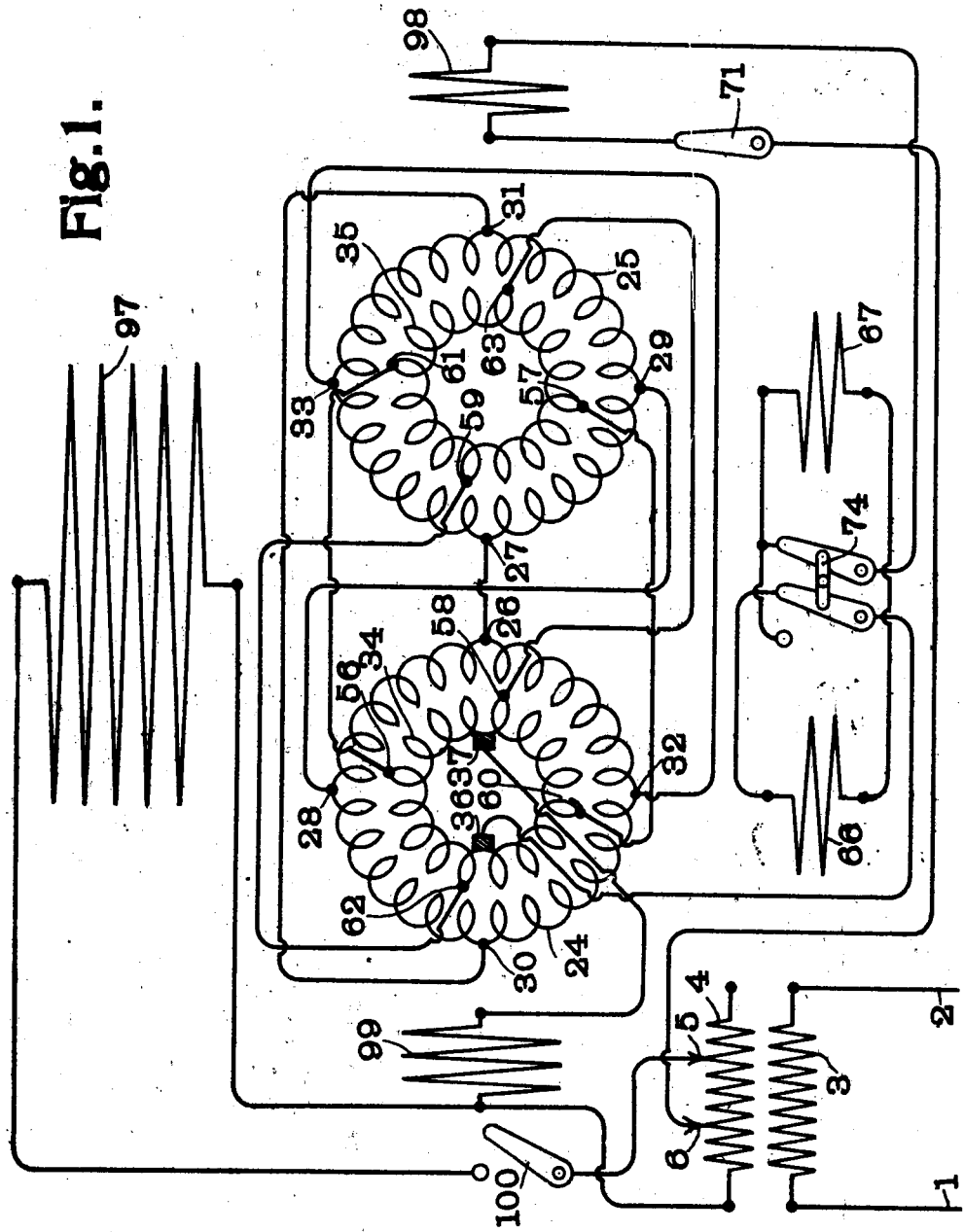

V. A. FYNN.
ALTERNATING CURRENT MOTOR.
APPLICATION FILED JULY 9, 1909.

962,335.

Patented June 21, 1910.
3 SHEETS—SHEET 1.

WITNESSES:
L. L. Mead
W. A. Alexander.

INVENTOR
Valére A. Fynn
BY
Fowler & Huffman
ATTORNEYS

V. A. FYNN.
ALTERNATING CURRENT MOTOR.
APPLICATION FILED JULY 9, 1909.

962,335.

Patented June 21, 1910.

3 SHEETS—SHEET 2.

WITNESSES:
L. L. Mead.
W. A. Alexander.

INVENTOR
Valère A. Fynn
BY
Fowler & Huffman
ATTORNEYS

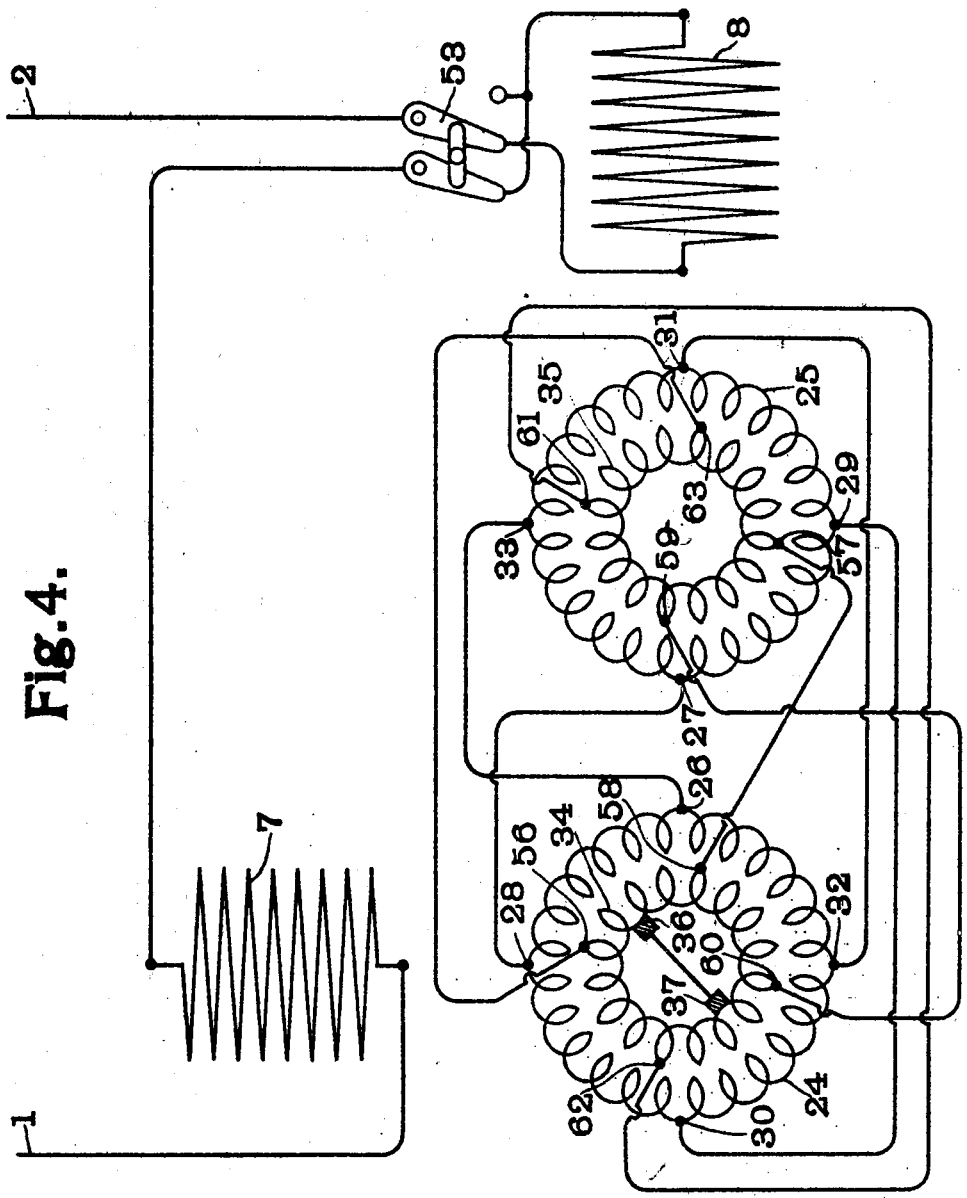

UNITED STATES PATENT OFFICE.

VALÈRE ALFRED FYNN, OF LONDON, ENGLAND.

ALTERNATING-CURRENT MOTOR.

962,335. Specification of Letters Patent. Patented June 21, 1910.

Application filed July 9, 1909. Serial No. 506,728.

*To all whom it may concern:*

Be it known that I, VALÈRE ALFRED FYNN, a subject of the King of England, residing at London, England, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to means for starting and operating single phase induction motors in which the induced winding responsible for the operation of the motor is permanently closed on itself independently of any commutator. It is known that motors of this type have distinct mechanical advantages and good operating characteristics but are difficult to start with a powerful torque and with a small current or in other words with a large torque per ampere.

One object of my invention is to provide such means for starting said motors with a large torque per ampere as will not make it necessary to dimension or dispose the secondary working winding permanently closed on itself with any other objects in view but those of highest effectiveness and efficiency under normal running conditions.

Other objects of my invention are to avoid the use of all automatic short-circuiting devices inside the rotor and to generally improve their characteristic properties both at starting and under normal working conditions.

I achieve my object by dividing the rotor laminations into two groups providing the rotor with a permanently short-circuited winding extending over both groups of rotor laminations and a commuted winding also extending over both groups of rotor laminations and by so disposing these two windings relatively the one to the other that their conductors which lie adjacent to each other on one group of the rotor laminations shall be displaced from each other on the other group of the rotor laminations. I preferably make this displacement equal to $360/n$ degrees. Owing to this disposition it will be impossible for these windings to produce inductive effects the one on the other. An alternating current flowing in one of the windings will not induce a resultant E. M. F. or cause a current to flow in the other winding. A flux which threads the whole of one winding in the same direction will thread equal parts of the other winding in opposite directions and will thus only be able to interact with the former. I make use of the commuted winding in order to start the motor as an induction or a conduction motor and I make use of the short-circuited rotor winding in normal operation to carry the whole or the greater part of the working current. I bring this short-circuited winding into play by suitably modifying the connections of the stator windings either automatically or by hand and after a sufficient speed has been reached or I induce a current in said winding at starting.

In describing some ways of carrying my invention into practice I will refer to the accompanying diagrammatic drawings of two-pole motors where—

Figure 2:
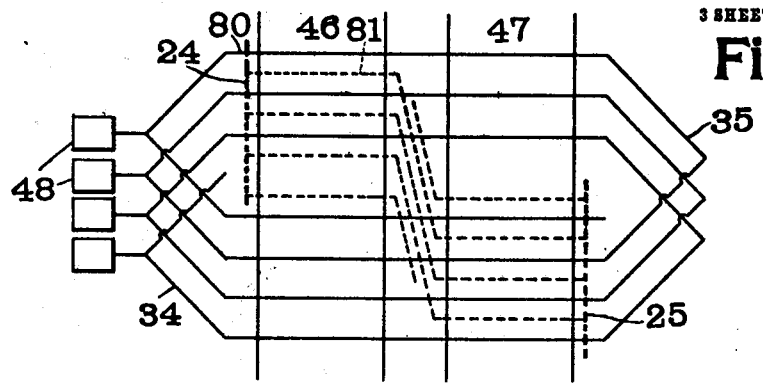
Figure 3:
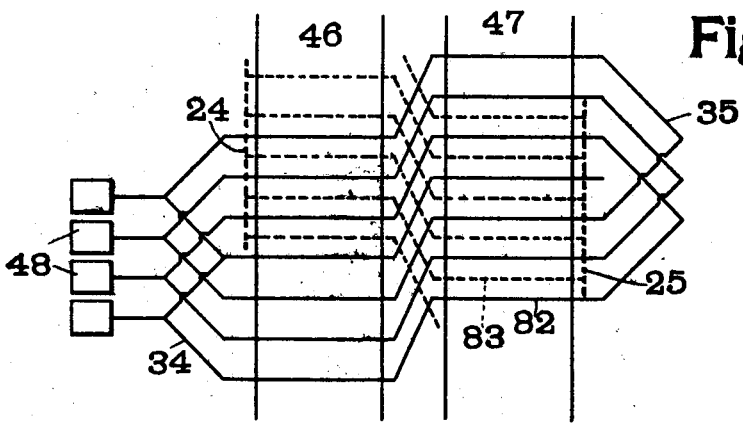
Figure 5:
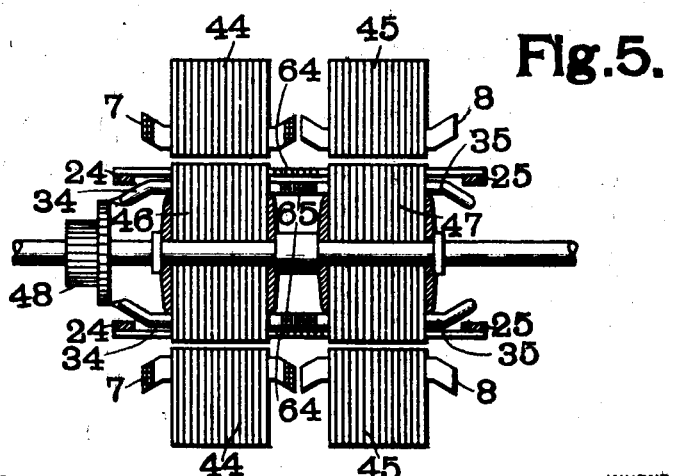

Figure 1 shows a motor adapted to start mainly as a neutralized series conduction motor. Fig. 2 indicates the manner in which conductors which are adjacent on one group of rotor laminations are displaced on the other group. Fig. 3 shows another way of displacing on one group of laminations, conductors which are adjacent on the other group. Fig. 4 illustrates a motor adapted to start as a self-excited series induction motor. Fig. 5 indicates the mechanical disposition of the motor parts for the machine shown in Fig. 4.

Fig. 1 shows the preferred form of my motor. This machine comprises two longitudinally displaced groups of laminations. The permanently short-circuited working winding embracing both groups of rotor laminations is shown for the sake of clearness and ease of illustration as consisting of two permanently interconnected windings 24, 25. These are interconnected at four points, 28, 29; 26, 27; 32, 33; and 30, 31; they can be interconnected at any number of points, the more the better. The two windings 24, 25 are equivalent to a single winding wound through both groups of rotor laminations. The rotor also carries a commuted winding disposed on both groups of rotor laminations, and this winding is also shown for the sake of clearness and ease of illustration as consisting of two interconnected windings 34, 35. Only four points are shown as being interconnected; in practice it would be necessary to interconnect many more points, in fact every coil of 34 and 35 should be interconnected. The fact that adjacently situated elements of 34 and 24 on one group of laminations must be displaced by about 360/n degrees on the other group of laminations is diagrammatically indicated in Fig. 1 by connecting point 56 to point 61 instead of 57; point 58 to point 63 instead of 59; point 60 to 57 instead of 61 and point 62 to 59 instead of 63. The stator is provided with two groups of laminations and carries a main winding 97 embracing both groups of laminations. Owing to the above described relative position of the short-circuited and the commuted rotor windings it is only the short-circuited winding which can be responsive to inductive effects due to 97. The stator also carries two auxiliary windings 99, 66 and 98, 67 on each group of laminations, the auxiliary windings on each group being displaced by 180/n degrees with respect to each other and one of them being displaced by that angle with respect to 97. Brushes are disposed on the commuted winding 34, 35 along an axis displaced by about 180/n degrees with respect to the axis of 97. The stator windings are arranged in two parallel circuits both fed from the mains 1, 2 through the transformer having a primary 3 and a secondary 4. One circuit comprises the winding 97 and the switch 100 and the E. M. F. impressed on this circuit can be adjusted at 5. In the other circuit are connected in series all the four auxiliary windings and the commuted winding 34, 35. The E. M. F. impressed on that circuit can be adjusted at 6 and the circuit is controlled by switch 71, whereas switch 74 allows of the current being simultaneously reversed through 66 and 67. At starting, switch 71 is closed and switch 100 is open. Windings 99 and 98 are neutralizing windings and so connected as to oppose the ampere turns of the commuted winding; for this reason they magnetize in the same direction with reference to the commuted winding. Windings 99 and 98 have no effect on the short-circuited winding for they magnetize in opposite directions with reference to the latter. The windings 66, 67 do duty as field windings. They magnetize in the same direction with reference to the commuted winding so that the ampere turns of the commuted winding situated on one group of rotor laminations may produce a torque in the same direction as the ampere turns of that same winding disposed on the other group. Windings 66, 67 magnetize in opposite directions with reference to the short-circuited rotor working winding and it is seen that the machine can be started with a powerful torque without any current flowing in the short-circuited winding. To reverse the direction of rotation it is only necessary to reverse the motor field relatively to the armature current. This can be achieved by means of 74 which reverses the current through the field windings. The neutralizing windings can be dispensed with without reducing the torque per ampere. When the motor has reached a sufficient speed then switch 100 is closed and 71 may be opened although of course it is not necessary to do so. Switch 100 may be closed at starting when the torque per ampere will be somewhat reduced but the machine will then never race and winding 97 and the short-circuited rotor winding will automatically contribute to the torque after a sufficient speed has been reached. In normal operation the short-circuited rotor winding acts just like the secondary of a self-excited shunt induction motor.

In Fig. 2 is shown a commuted lap winding 34, 35 connected to a commutator 48, this winding being placed in the correct relative position to the short-circuited working winding 24, 25 which is here shown as of the squirrel-cage type. The arrangement shown in Fig. 2 corresponds to that indicated in Fig. 1 with this difference however that in Fig. 2 it is the commuted and not the short-circuited winding which is wound straight through the two groups of rotor laminations 46, 47. On group 46 the conductor 80 of the commuted winding is adjacent to the conductor 81 of the squirrel-cage whereas on group 47 these two conductors are displaced from each other by about 360/n degrees, it being supposed that each coil of the commuted winding spans approximately a pole pitch.

In Fig. 3 the conductor 82 of the commuted winding is adjacent to conductor 83 of the squirrel-cage in group 47 and these same conductors are displaced by about 360/n degrees on group 46 but neither of the windings is wound straight through, the conductors of the one are displaced by about 180/n degrees in one direction after they leave one group of laminations, whereas those of the other are displaced by about 180/n degrees in the other direction. This arrangement allows of the space between 46 and 47 to be reduced.

The arrangement of rotor windings illustrated in Fig. 3 is diagrammatically reproduced in Fig. 4 by connecting point 28 of winding 24 to point 27 instead of to point 29 or to point 33 of winding 25 and by connecting point 56 of winding 34 to 63 instead of to 57 or to 61 of winding 35 and so on. This arrangement of rotor windings necessitates a corresponding angular displacement of the main or inducing fluxes threading each group of laminations. This can be achieved by not winding the main stator winding straight through from one to the other group or by making use of a separate main stator winding for each group of laminations and displacing these two main windings 7 and 8 by 180/n degrees as shown in Fig. 4. In Fig. 4 these two winding are connected in series, but they can of course just as well be connected in parallel. The commuted winding is short-circuited along an axis displaced from either of the axes of the main fluxes due to 7 and 8 and since 7 and 8 are connected at starting as indicated in Fig. 4 then they will not induce any currents in 24, 25 but will induce currents in 34, 35 and the machine will start as a self-excited series induction motor. When a sufficient speed has been reached the current through 8 is reversed at 53 thus putting winding 34, 35 out of commission and bringing winding 24, 25 into play.

In Fig. 5 I have illustrated a possible mechanical disposition of the active parts constituting the motor which has been more particularly described in connection with Fig. 4. The rotor windings are shown in section at 64 and 65 to indicate that they both cross the space between 46 and 47 diagonally as better shown in Fig. 3.

Having fully described my invention what I claim as new and desire to secure by Letters Patent of the United States, is:

1. In an alternating current motor, the combination with a stator, of a rotor having two longitudinally displaced groups of laminations and provided with a short-circuited winding and a commuted winding, the conductors of these two windings which lie adjacent to each other on one group of rotor laminations being displaced from each other on the other group of rotor laminations.

2. In an alternating current motor, the combination with a stator, of a rotor provided with a permanently short-circuited winding and a commuted winding, the conductors of these two windings which lie adjacent to each other on one half of the rotor laminations being displaced from each other on the other half.

3. In an alternating current motor, the combination with a stator provided with a plurality of windings, of a rotor provided with a permanently short-circuited winding and a commuted winding, the conductors of these two windings which lie adjacent to each other on one half of the rotor laminations being displaced from each other on the other half.

4. In an alternating current motor, the combination with a stator provided with a plurality of windings, of a rotor provided with a permanently short-circuited winding and a commuted winding, the conductors of these two windings which lie adjacent to each other on one half of the rotor laminations being displaced from each other by 360/n degrees on the other half.

5. In an alternating current motor, the combination with a stator, of a rotor having two longitudinally displaced groups of laminations and provided with a short-circuited winding and a commuted winding, the conductors of these two windings which lie adjacent to each other on one group of rotor laminations being displaced from each other on the other group of rotor laminations, and means for permitting a working current to flow in the commuted winding at starting.

6. In an alternating current motor, the combination with a stator, of a rotor having two longitudinally displaced groups of laminations and provided with a short-circuited winding and a commuted winding, the conductors of these two windings which lie adjacent to each other on one group of rotor laminations being displaced from each other on the other group of rotor laminations, means for producing a transformer flux and brushes on the commuted winding displaced from the axis of the transformer flux.

7. In an alternating current motor, a stator containing two longitudinally displaced groups of laminations, means for producing a main flux through each group of laminations, a rotor having two longitudinally displaced groups of laminations and provided with a short-circuited winding and a commuted winding, the conductors of these two windings which lie adjacent to each other on one group of rotor laminations being displaced from each other on the other group of rotor laminations.

8. In an alternating current motor, a stator containing two longitudinally displaced groups of laminations, means for producing a main flux through each group of laminations, a rotor having two longitudinally displaced groups of laminations and provided with a short-circuited winding and a commuted winding, the conductors of these two windings which lie adjacent to each other on one group of rotor laminations being displaced from each other on the other group of rotor laminations, and means for directing the flow of current in the commuted winding.

9. In an alternating current motor, a stator containing two longitudinally displaced groups of laminations, means for producing a main flux through each group of laminations the main flux in the one group being displaced from the main flux in the other group by 180/n degrees, a rotor having two longitudinally displaced groups of laminations and provided with a short-circuited winding and a commuted winding, the conductors of these two windings which lie adjacent to each other on one group of rotor laminations being displaced from each other on the other group of rotor laminations, and means for directing the flow of current in the commuted winding.

10. In an alternating current motor, a stator containing two longitudinally displaced groups of laminations, each group being provided with a main winding and the two main windings being displaced by $180/n$ degrees from each other, a rotor having two longitudinally displaced groups of laminations and provided with a short-circuited winding and a commuted winding, the conductors of these two windings which lie adjacent to each other on one group of rotor laminations being displaced from each other on the other group of rotor laminations, means for short-circuiting the commuted winding along a stationary axis, and means for reversing current through one of the stator windings.

In testimony whereof I have hereunto set my hand and affixed my seal in the presence of the two subscribing witnesses.

VALÈRE ALFRED FYNN. [L. S.]

Witnesses:
ELIZABETH BAILEY,
E. E. HUFFMAN.